United States Patent [19]

Bucko, Sr.

[11] Patent Number: 4,852,612
[45] Date of Patent: Aug. 1, 1989

[54] FLUID FLOW CONTROL DEVICE

[76] Inventor: Edward P. Bucko, Sr., P.O. Box 721, Silver Star, Mont. 59751

[21] Appl. No.: 535,053

[22] Filed: Sep. 23, 1983

[51] Int. Cl.$^4$ .......................................... F16K 11/044
[52] U.S. Cl. .................................................. 137/625.5
[58] Field of Search ...................... 137/625.48, 625.28, 137/357, 454.2, 454.4, 454.5, 454.6, 625.67, 625.65, 625.5; 251/367, 360

[56] References Cited

U.S. PATENT DOCUMENTS

| 2,086,868 | 7/1937 | Hall ...................................... 251/357 |
| 2,616,658 | 11/1952 | Dombeck .......................... 137/625.5 |
| 3,303,854 | 2/1967 | Churchill ....................... 137/625.65 |
| 3,902,526 | 9/1975 | Brake et al. .................. 137/625.5 X |
| 4,078,579 | 3/1978 | Bucko, Sr. ...................... 137/625.48 |
| 4,317,469 | 3/1982 | Pauliukonis .................... 137/625.65 |
| 4,442,998 | 4/1984 | Ohyama et al. ............. 137/625.5 X |

FOREIGN PATENT DOCUMENTS

| 1085736 | 7/1960 | Fed. Rep. of Germany ......................... 137/625.48 |
| 2537347 | 3/1976 | Fed. Rep. of Germany ......................... 137/625.27 |
| 371484 | 11/1906 | France ............................ 137/625.48 |
| 580774 | 9/1946 | United Kingdom ............. 137/625.5 |

Primary Examiner—Martin P. Schwadron
Attorney, Agent, or Firm—Fleit, Jacobson, Cohn, Price, Holman & Stern

[57] ABSTRACT

A three-way valve comprises a cylindrical valve chamber with a pair of axially spaced ports on one side and a third centrally located port on the other side. A valve disk on an axial valve rod is movable between positions on opposite sides of the third port to control communication between the ports. The chamber includes liner sleeves between which the valve disk moves and against the inner ends of which the disk bears in its respective positions. The sleeves support the disk against fluid pressure forces resulting from flow between the ports, and an effective seal is provided between the disk and the respective sleeve.

3 Claims, 1 Drawing Sheet

FLUID FLOW CONTROL DEVICE

BACKGROUND OF THE INVENTION

This invention relates to a valve structure for controlling fluid flow between respective inlet and outlet ports, the structure being of the type comprising a housing defining a cylindrical valve chamber, at least two axially spaced ports communicating with the chamber, and a valve rod and valve disk within the chamber, the disk being movable axially between alternative positions respectively establishing and blocking communication between the ports.

A three-way valve of the above type is disclosed, for example, in applicant's prior U.S. Pat. No. 4,078,579. In the prior arrangement, the valve includes a pair of axially spaced ports on one side of the chamber, and a third centrally located port on the other side of the chamber. The valve disk is movable between positions on opposite sides of the third port, so as to connect the third port with one (or other) of the axially spaced ports, while blocking communication between the third port and the other (or one) of the axially spaced ports. The valve disk is of a flexible nature and flips overcenter in moving between its respective positions.

Three-way valves of the type referred to in the quoted patent have diverse uses, and are particularly suitable, for example, in the liquid flow circuits of recreational vehicles and the like where, when winterization of the circuit is required, connection is to be made to a source of anti-freeze solution, not otherwise used in the circuit. The valves operate generally satisfactorily in this and other applications. However, when flexible valve disks are used, pressure forces acting on a disk resulting from fluid flow through the valve, may tend to distort the periphery of the disk out of sealing engagement with the circumferential wall of the valve chamber, resulting in valve leakage.

The present invention provides a means for effectively reducing the aforesaid leakage.

STATEMENT OF PRIOR ART

Acknowledgement is made of the following U.S. patents pertinent to valve systems as herein discussed. However, none of these patents is believed to disclose a solution to the leakage problem as proposed by the present invention. U.S. Pat. Nos.:
1,029,600
1.851,016
2,469,921
2,661,182
2,738,797
2,739,613
2,782,610
3,191,626
3.435.951
4.337,797

SUMMARY OF THE INVENTION

In accordance with the present invention, in a valve structure of the type referred to, the valve chamber is provided with internal annular shoulder means, such as the end of a sleeve-type liner, against which the peripheral portion of the valve disk is adapted to bear when the disk is in a position establishing communication between a pair of ports, whereby the shoulder means provides support for the peripheral portion of the disk against pressure forces acting on the disk resulting from fluid flow between the ports. Provision of the shoulder means enhances the sealing effect of the valve disk to an extent whereby frictional engagement of the disk around the internal peripheral wall of the valve chamber is no longer so critical.

In a three-way valve having a pair of axially spaced ports on one side of the valve chamber and a third centrally located port on the other side selectively placed in communication with one or other of said pair of ports by positioning the valve disk on one or other side of the third port, the shoulder means may comprise a pair of linear sleeves disposed respectively on opposite side of the third port, so that the disk moves between positions engaging the inner ends of the respective sleeves, each sleeve having an opening registering with one of said pair of ports. The valve may be solenoid operated by solenoids at opposite ends of the housing, opposite ends of the valve rod being received within the respective solenoid coils.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENT

Figure 1:
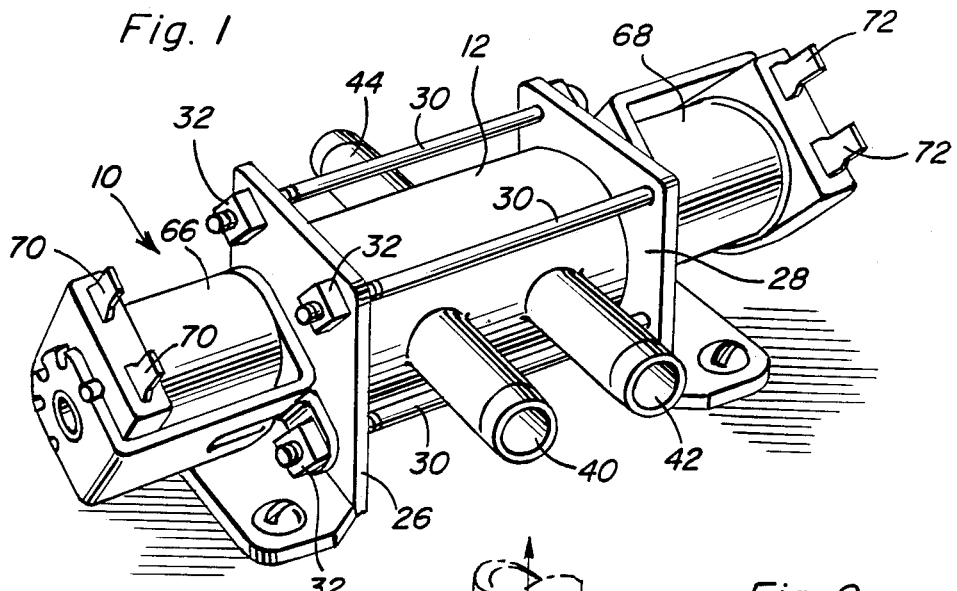
FIG. 1 is a perspective view of a three-way valve in accordance with the invention.

The illustrated three-way valve 10 comprises a cylindrical valve housing 12 defining an internal valve chamber 14, end covers 16 and 18 for the valve housing, the end covers being formed with elongate hollow extensions 20, 22 forming slide bearings for opposite ends of valve rod 24, brackets 26, 28 embracing the covers, and tie rod-type screws 30 and nuts 32 holding the brackets, end covers and valve housing together.

Figure 2:
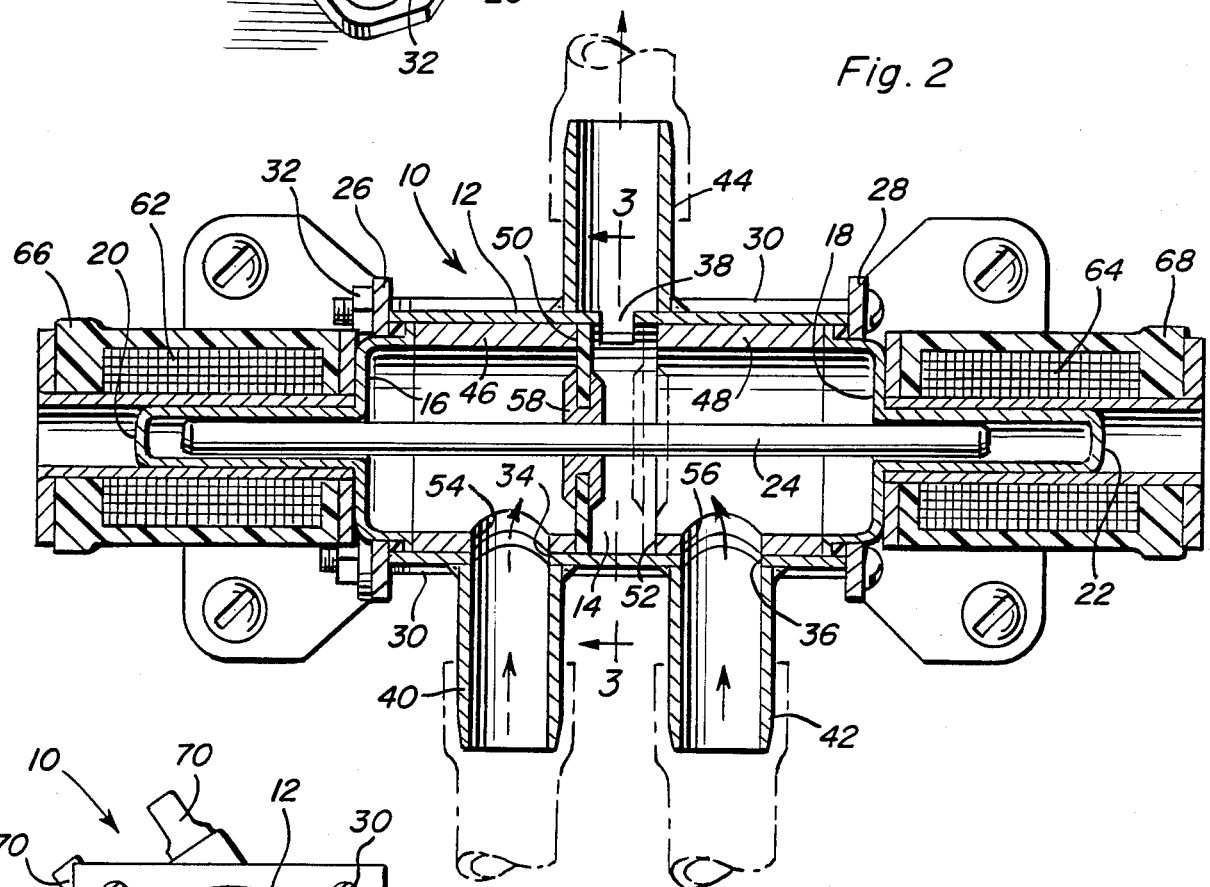
FIG. 2 is an enlarged cross-sectional view through the valve.
Figure 3:
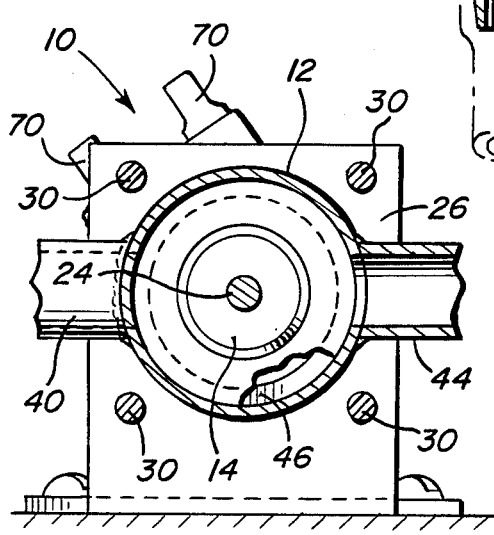
FIG. 3 is a sectional view on line 3—3 of FIG. 2.

Housing 12 is formed on one side with a pair of axially spaced ports 34, 36 and on the other side with a third centrally located port 38 between ports 34 and 36. The ports are provided with respective line connectors 40, 42, 44. Internally, valve chamber 14 is provided with a pair of tight-fitting liner sleeves 46, 48 the inner ends 50, 52 of which are located on opposite sides of central port 38. The sleeves have openings 54, 56 registering respectively with ports 34 and 36. Valve rod 24 has a fixed central collar 58 carrying a valve disk 60, which may be of flexible or resilient material. The outer diameter of the disk conforms to the diameter of chamber 14. The disk is located between the inner ends of sleeves 46, 48 and can be moved by axially moving rod 24 between a first position, shown in full line in FIG. 2, wherein the disk engages against the inner end of sleeve 46, and a second position, shown dotted in FIG. 2, wherein the disk engages against the inner end of sleeve 48. The inner ends of the respective sleeves accordingly form shoulders against which opposite sides of the valve disk may engage in the respective positions of the disk.

Solenoid coils 62, 64 surrounding cover extensions 20, 22 are provided for moving the valve rod axially thereby moving the disk between the first and second positions. The solenoid coils are contained in casings 66, 68 secured to brackets 26, 28, and electrical connections 70, 72 are provided for selectively energizing the respective coils.

When the valve disk is in the first (left hand) position against the inner end of sleeve 46, communication is established between ports 38 and 36, while the disk blocks communication between ports 38 and 34. Similarly, when the disk is in the second (right hand) position against sleeve 48, communication is established between ports 38 and 34, and the disk blocks communication between ports 38 and 36. In each position the respective sleeve provides support for the disk against fluid pressure forces resulting from fluid flow between the communicating ports. Further, an effective seal is established between the peripheral portion of the disk and the respective sleeve end, so that sealing with the inner wall of the valve chamber around the peripheral edge of the disk is not as critical as in prior art structures, and variations or inconsistencies in disk diameter can be accommodated. Because of the sealing effect between the disk and the respective sleeves, the disk diameter can be equal to or even slightly less than the diameter of the valve chamber.

The valve structure can be used with port 38 as the inlet and ports 34 and 36 as outlets, or alternatively, ports 34 and 36 can be inlets and port 38 can be an outlet. In the latter case, fluid pressure applied at one of the inlets can be used to move the valve disk between its respective positions without recourse to the solenoids.

One application of a valve structure in accordance with the invention is, for example, in the water supply system of a recreational vehicle having a fresh water tank, a hot water tank pressurized by a pump or by compressed air, and a tank of anti-freeze solution having its own pressurized system. In this arrangement, port 38 can be coupled to the anti-freeze tank, and port 34 to the fresh water tank. When winterization is required, it is only necessary to empty the fresh water tank and the hot water tank (the valve can be used to bypass the source line into the hot water tank), discontinue the pressure of the fresh water source and turn on the pressure to the anti-freeze solution source. Since pressure at ports 34 and 36 can control the position of the valve disk, the valve allows anti-freeze to flow through all pipelines while preventing the anti-freeze entering the fresh water and hot water tanks.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A three-way valve structure comprising a housing defining a cylindrical valve chamber, a pair of axially spaced ports communicating with the chamber, a third central port communicating with the chamber between said pair of ports, an axially extending valve rod carrying a thin flexible valve disc mounted in the chamber for movement therein between respective first and second positions, the valve disc in the first position being located on one side of the third port providing communication between the third port and one of said pair of ports while blocking communication between the third port and the other of said pair of ports, the valve disc in the second position being located on the other side of the third port providing communication between the third port and said other of the pair of ports while blocking communication between the third port and said one of the pair of ports, the valve chamber including a pair of tight-fitting cylindrical liner sleeves covering the respective axially spaced ports, the liner sleeves having openings communicating with the respective axially spaced ports, the liner sleeves further having spaced inner ends located respectively on opposite sides of the third port, the disc being movable between the respective inner ends of the sleeves and engaging face to face against the respective inner ends of the sleeves in the respective first and second positions of the disc, the ends of the periphery of the sleeves providing sealing and support for the disc against fluid pressure forces resulting from fluid flow between the respective ports and tending to distort the periphery of the disc.

2. The invention of claim 1 including covers for opposite ends of the chamber, the covers having axial hollow extensions forming bearings for opposite ends of the valve rod, and solenoid coils surrounding the respective extensions for operating the valve rod.

3. A recreational vehicle water supply having an antifreeze tank, a fresh water tank, and a three-way valve structure comprising a housing defining a cylindrical valve chamber, a pair of axially spaced ports communicating with the chamber, a third central port communicating with the chamber between said pair of ports, an axially extending valve rod carrying a thin flexible valve disc mounted in the chamber for movement therein between respective first and second positions, the valve disc in the first position being located on one side of the third port providing communication between the third port and one of said pair of ports while blocking communication between the third port and the other of said pair of ports, the valve disc in the second position being located on the other side of the third port providing communication between the third port and said other of the pair of ports while blocking communication between the third port and said one of the pair of ports, the valve chamber including a pair of tight-fitting cylindrical liner sleeves covering the respective axially spaced ports, the liner sleeves having openings communicating with the respective axially spaced ports, the liner sleeves further having spaced inner ends located respectively on opposite sides of the third port, the disc being movable between the respective inner ends of the sleeves and engaging face to face against the respective inner ends of the sleeves in the respective first and second positions of the disc, the ends of the sleeves providing sealing and support for the periphery of the disc against fluid pressure forces resulting from fluid flow between the respective ports and tending to distort the periphery of the disc, wherein the third port is coupled to the antifreeze tank of the recreational vehicle water supply, and one of the pair of ports is connected to the fresh water tank of the water supply.

* * * * *